United States Patent [19]
Clark

[11] 3,720,789
[45] March 13, 1973

[54] ELECTRICAL SIGNALLING SYSTEMS USING CORRELATION DETECTORS

[75] Inventor: Adrian Percy Clark, Taplow, England

[73] Assignee: Plessey Telecommunications Research Limited, Taplow, England

[22] Filed: July 27, 1970

[21] Appl. No.: 58,621

[30] Foreign Application Priority Data

July 28, 1969 Great Britain....................37,750/69
Dec. 30, 1969 Great Britain....................63,366/69

[52] U.S. Cl...........................................179/15 BC
[51] Int. Cl...........................................H04b 1/14
[58] Field of Search.........179/15 BC, 15 AP, 15 AN; 178/50; 340/347 DA

[56] References Cited

UNITED STATES PATENTS

| | | | |
|---|---|---|---|
| 3,204,034 | 8/1965 | Ballard | 179/15 BC |
| 3,160,874 | 12/1964 | Hamori | 340/347 DA |
| 3,145,377 | 8/1964 | Saal | 340/347 DA |
| 2,963,698 | 12/1960 | Slocomb | 340/347 DA |
| 3,394,224 | 7/1968 | Helm | 178/50 |
| 3,484,554 | 12/1969 | Gutleber | 179/15 BC |
| 3,384,715 | 5/1968 | Higuchi | 179/15 BC |
| 2,681,384 | 6/1954 | Guanella | 179/15 AN |
| 2,579,071 | 12/1951 | Hansell | 179/15 AN |

*Primary Examiner*—Ralph D. Blakeslee
*Assistant Examiner*—David L. Stewart
*Attorney*—Young & Thompson

[57] ABSTRACT

In an electrical signalling system the signals are arranged to be split up into signal groups, each of which contains a predetermined number of signal elements which are linearly independent with respect to each other at the transmitter, corresponding signal elements in successive groups being related to each other and forming a series of signal elements. A receiver for such a system comprises either one correlation detector successively tuned to receive each series of signal elements or a plurality of correlation detectors each tuned to receive a respective series. Means responsive to the output of said correlation detector or detectors is arranged to produce a respective output signal for each series of signal elements.

19 Claims, 8 Drawing Figures

INVENTOR
ADRIAN PERCY CLARK
By Young & Thompson
ATTYS.

INVENTOR
ADRIAN PERCY CLARK
BY Young & Thompson
ATTYS.

DATA TRANSMISSION SYSTEM

INVENTOR
ADRIAN PERCY CLARK
BY Young & Thompson
ATTYS.

INVENTOR
ADRIAN PERCY CLARK
By Young & Thompson
ATTYS.

SIMPLIFIED ITERATIVE DETECTOR

INVENTOR
ADRIAN PERCY CLARK
BY Young & Thompson
ATTYS.

ELECTRICAL SIGNALLING SYSTEMS USING CORRELATION DETECTORS

This invention relates to electrical signalling systems.

FIELD AND SUMMARY OF THE INVENTION

In many applications of frequency, time or code division multiplex using digital signals, a single receiver is fed from many transmitters and the resultant received signal contains separate groups of signal elements, the different elements in a group originating from different transmitters. A similar received signal is produced when a single transmitter feeds a single receiver and the transmitted signal elements are arranged in separate groups. In both cases, the received signal contains a sequence of separate components each of which is the sum of several individual signal elements. At the transmitter or transmitters, such signals are normally arranged to be orthogonal. In other words, there is no cross-correlation between the individual signal elements. However, during passage along the transmission path, the signal may be distorted so that cross-correlation between the individual signal elements in a group may exist in the received signal. By using a sufficient time interval between successive groups of transmitted signal elements, it can be arranged that the received signal elements in any one group are always orthogonal with respect to those in any other.

One aspect of this invention relates to a receiver for use in an electrical signalling system in which the signals are arranged to be split up into signal groups, each of which contains a predetermined number of signal elements which are linearly independent with respect to each other at the transmitter, but not necessarily orthogonal as in the above-mentioned prior art arrangements corresponding signal elements in successive groups being related to each other and forming a series of signal elements; the receiver comprising correlation detection means tuned to receive each series of signal elements and means responsive to the output of said correlation detection means for producing a respective output signal for each series of signal elements.

Another aspect of this invention relates to a method of receiving signals in an electrical signalling system in which the signals are arranged to be split up into groups each of which contains a predetermined number of signal elements which are linearly independent with respect to each other when transmitted but not necessarily orthogonal, corresponding signal elements in successive groups being related to each other and forming a series of signal elements; the method comprising applying the signals to correlation detection means, combining each component of the output of said correlation detection means with a respective element of the signal which would be received at the input of the correlation detection means for a predetermined set of element values to produce a feedback signal and applying said feedback signal to the input of the correlation detection means.

In a preferred form of the invention, which uses an iterative detection process, the equipment complexity increases approximately linearly with the number of elements. In this preferred form, the outputs of the various correlation detectors are each combined with a respective locally generated signal identical with the signal to which the associated correlation detector is tuned. The various signals produced by this process are then added together and the resultant summation signal is fed back to the inputs of the correlation detectors where it is subtracted from the received signal. This of course changes the inputs to the correlation detectors and therefore their output signals, causing a further change to the resultant summation signal subtracted from the input, and so on until a steady state condition is reached when the output signals from the correlation detectors are reduced to zero.

In a particular embodiment of the invention, where a single transmitter sends a serial digital signal to a single receiver, via a channel whose transmission characteristics may vary with time, a single correlation detector is provided and is tuned successively to each element of a group in turn while the iterative process is carried out. Variations in the impulse response of the channel are determined by an iterative process, preferably using the same apparatus as is used to detect the received signals.

The term "linearly independent" means that none, of a group of signals so described can be derived from a linear combination of some or all of the other signals of the group.

The term "orthogonal" is used herein in the sense which it is used in mathematics. In system such as those with which the present invention is concerned, if a group of signals have no cross-correlation with each other, then the vectors representing these signals are orthogonal. If these vectors are supplied to an orthogonal transformation matrix, the output vectors are also orthogonal. Consequently the signals represented by such output vectors have no cross-correlation with each other.

BRIEF DESCRIPTION OF THE DRAWINGS

The invention will be more readily understood from the following description with reference to the accompanying drawings, in which.

DESCRIPTION OF THE PREFERRED EMBODIMENTS

Figure 1:
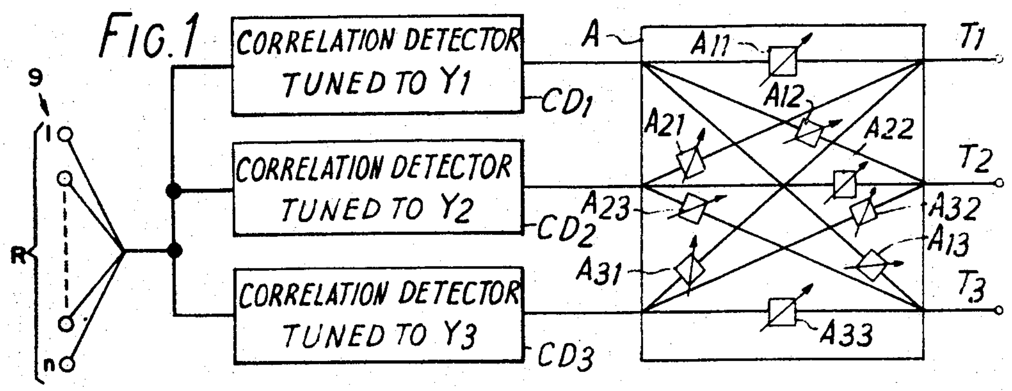
FIG. 1 is a block schematic diagram of a non iterative detector for a digital transmission system in which signal elements are transmitted in groups of three.

In the following description it is assumed that the transmission channel is a linear baseband channel such as would be provided either by a pair of wires, the different segments of which are coupled to each other via linear amplifiers and filters, or else by a linear modulator feeding a band-pass channel, such as a radio link or telephone circuit, which in turn feeds a linear demodulator. In every case the received signal-elements at the channel output are baseband signals, and these are separated into disjoint or orthogonal groups. There are $m$ signal-elements in each group, and the received baseband signal is sampled at regular intervals, $n$ times for each group, where $n \geqslant m$. The detector detects each group of $m$ signal-elements in a separate detection process and operates simultaneously on the$m$ elements in a group. In any detection process, the detector operates entirely on the corresponding $n$ sample values of the received baseband signal. Adjacent groups of elements are separated by sufficient time intervals to ensure that no significant intersymbol interference is caused in the n sample values of one group, by the neighboring groups. Thus no group of signal elements causes interference in the detection of any other group.

The$m$ received signal-elements in each group are only non-zero over the period occupied by the corresponding $n$ sampling instants. This period will be known as the element period. Thus, in the case where the $m$ signals originate from separate transmitters, the signals must be synchronously multiplexed to be in element synchronism.

The received signals are assumed to be band-limited and suitably shaped so that all the useful information in each of the$m$ signal elements is given by the sample values of the received waveform at the same regularly spaced $n$ instants over the element period. Thus the $n$ sample-values used in any detection process contain all the useful received information of the corresponding $m$ signal-elements.

It is assumed here that the receiver has prior knowledge of the correct $n$ sampling instants for each group of received signal-elements. This knowledge may be derived from a separate transmitted timing signal or else from the received data signals themselves. Thus, over each element period, the receiver samples the received signal at the $n$ sampling instants and stores the sampled voltages in $n$ stores. The $n$ sample values are then used in the subsequent detection process. Clearly, the received signal in a detection process is given completely by the $n$ sample values.

Except where otherwise stated, it is assumed that the $m$ signal-elements in a group are binary-coded bipolar signals. The $n$ sample values of the ith element in a group, if this element is received on its own and in the absence of noise, are given by $$z_i y_{i1}\ z_i y_{i2} \ldots z_i y_{in}$$

where $z_i = \pm\ |z_i|$ for $i = 1, \ldots, m$ and $y_{ij}$ is the $j$th sample value of the $i$th received element when this is received on its own and in the absence of noise with $z_i = 1$.

It is also for convenience arranged that $$\sum_{j=1}^{n} y_{ij}^2 = 1 \text{ for } i = 1, \ldots, m$$

$|z_i|$ is the magnitude of $z_i$ and is independent of the element binary-value. $z_i$ is positive or negative depending upon whether the binary value of the element is 0 or 1 respectively.

The $n$-component row-vector $Y_i$ is defined to be the sequence of numbers $$y_{i1}\ y_{i2} \ldots y_{in} \text{ for } i = 1, \ldots, m$$

so that $$z_i y_{i1}\ z_i y_{i2} \ldots z_i y_{in} = z_i Y_i \text{ for } i = 1, \ldots, m$$

Clearly, the vector $Y_i$ has unit length, for all $i$, and the vector $z_i Y_i$ has length $|z_i|$. Thus the binary value of $z_i Y_i$ is given by the sign of $z_i$ and its level by $|z_i|$.

$Y_i$ is determined partly by the shape of the transmitted ith signal-element in the group of $m$ and partly by the impulse response of the channel. The shapes of the transmitted signal-elements are of coarse chosen so that with typical channel transmission-characteristics the $m$ vectors $\{Y_i\}$ are as near orthogonal as possible.

The matrix $Y$ is defined to be the$m \times n$ matrix whose $i$th row is the vector $Y_i$.

The$m$-component row-vector $Z$ is defined to be the sequence of numbers $$z_1\ z_2 \ldots z_m$$

Since the $i$th received signal-element in a group of $m$, is $z_i Y_i$ it follows that in the absence of noise the sum of the $m$ received signal-elements is $ZY$.

The total received signal in a detection process is given by the appropriate $n$ sample values $\{r_i\}$ of the received baseband signal. These sample values are stored, and fed to the detector during the subsequent detection process. The $n$-component row-vector R is defined to be the sequence of sample values $$r_1\ r_2 \ldots r_n$$

It follows that $$R = ZY + W$$

where $W$ is the $n$-component row-vector whose components are the sample values of the received additive noise.

The function of the detector is to obtain the best possible estimates of the $m$ values $\{z_i\}$, in each detection process. Let $x_i$ be the estimate of $z_i$, determined in the detector. The$m$-component row-vector $X$ is defined to be the sequence of numbers $$x_1\ x_2 \ldots x_m$$

In order that the detector can estimate the $\{z_i\}$ from the received signal-vector $R$, it must have prior knowledge of the $\{Y_i\}$. Where the transmission characteristics of the channel do not vary with time, this prior knowledge can be obtained through the separate transmission of each of the$m$ signal-elements $z_i Y_i$ with $z_i = 1$. This is done before the transmission of data and each $Y_i$ is stored in the detector for use in the following detection processes. In order to reduce the effects of additive noise, each signal element with $z_i = 1$ may be transmitted several times and the average received vector $Y_i$, for each value of $i$, stored in the detector. Where the transmission characteristics of the channel vary slowly with time, this process of sending a training signal may be carried out at regular known intervals, interspersed between the transmission of data, in order to keep the detector correctly matched to the channel.

FIG. 1 shows a non-iterative detector for a digital transmission system where $m = 3$. The three signal-elements in each group are in element synchronism.

The detector samples the received baseband signal at the correct $n$ sampling points for a group of three signal-elements, where $n \geq 3$, and it stores the corresponding vector $R$. Two stores are required, so that while one holds $R$ for the subsequent detection process, the other is receiving the $n$ sample values for the next vector $R$. The three signal-elements of the stored vector $R$ are detected over the corresponding element period, in a single detection process.

The received signal at the $n$ terminals 9 of FIG. 1 is the $n$-component vector $R$. The three signal-elements are respectively $z_1Y_1$, $z_2Y_2$ and $z_3Y_3$, where $Y_1$, $Y_2$ and $Y_3$ are $n$-component vectors of unit length. $z_i$ has a different value for each of the different element values. Clearly $$R = z_1Y_1 + z_2Y_2 + z_3Y_3 + W = ZY + W$$

where $Z$ is the three-component row-vector $(z_i)$ and $Y$ is the $3 \times n$ matrix whose ith row is $Y_i$. $W$ is the noise vector, as before.

Respective correlation detectors CD1, CD2 and CD3 are provided for each of the three signal-elements. The inputs of correlation detectors CD1, CD2 and CD3 are connected to the $n$ input terminals 9 to receive vector $R$ by $n$-line highways shown in the drawing, for clarity of illustration, as thick lines. A correlation detector tuned to $Y_i$, for $i = 1, 2$ or 3, multiplies each component of $R$ by the corresponding component of $Y_i$ and sums the $n$ products to give the correlation detector output signal. It is of course assumed here that the receiver has an accurate prior knowledge of each of the signal vectors $Y_1$, $Y_2$ and $Y_3$.

It should be understood that each element is a binary-coded signal, the digit 0 being represented by a signal equal in magnitude at any instant of time to that representing the digit 1 but of opposite polarity. Thus, for example, in the case of the correlation detector CD1, the digit 0 may be represented by the signal $|z_1| Y_1$, and the digit 1 by the signal $-|z_1| Y_1$, where $|z_1|$ is the same for the two binary values of $z_1$. Under these conditions, and assuming that there is no cross correlation, the output of the detector CD1 will be a positive signal $|z_1|$ when a digit 0 is received and a negative signal of equal magnitude, $-|z_1|$, when a digit 1 is received.

The output of each of the correlation detectors CD1, CD2 and CD3 is connected to a unit A which comprises a network of amplifiers and attenuators and has a respective output terminal T1, T2 and T3 for each element. In the unit A, the output of the correlation detector CD1 is connected to the terminal T1 via a link A11, to the terminal T2 via a link A12 and for the terminal T3 via a link A13. The output of the correlation detector CD2 is similarly connected to the terminal T1 via a link A21, to the terminal T2 via a link A22 and to the terminal T3 via a link A23. The output of the correlation detector CD3 is connected to the terminal T1 via a link A31, to the terminal T2 via a link A32 and to the terminal T3 via a link A33. Each of the links A11 to A33 consists of an amplifier, an attenuator and possibly an inverter, so that the overall gain of the unit can be varied between a fairly large negative and a fairly large positive value. The upper limit to the magnitude of gain required will depend on the amount of cross-correlation introduced in the transmission path. In use, the gain of each of the links A11 to A33 is adjusted so that the outputs of terminals T1, T2 and T3 correspond to the three element values all cross-correlation effects being cancelled out. Thus at the end of an element detection process, in the absence of noise, the signals at T1, T2 and T3 will be $z_1$, $z_2$ and $z_3$ respectively. A necessary condition for the correct operation of this arrangement is that the signal-vectors $Y_1$, $Y_2$ and $Y_3$ are linearly independent which means that no one of the three can be expressed as a linear function of the other two. If the received signal-elements at terminal 9 are orthogonal, the gains of the links (A$ij$) for $i \neq j$, of the unit A, will be zero.

While this arrangement is sometimes satisfactory when the number of signal elements in a group is relatively small, it will be appreciated that the number of components of the unit A increases with the square of the number of signal elements and consequently the system is less satisfactory where the number of elements is large. The main weakness of the arrangement is that the components of the unit A cannot be determined directly from the training signal, so that the system is only really suitable for applications over a channel whose transmission characteristics do not vary with time and are known beforehand at the receiver. In the remaining embodiments of the invention, the equipment complexity merely increases linearly with the number of elements and all component values in the detector may be determined directly from the training signal. Consequently these embodiments are more suitable for use either when the number of channels is large or when the channel transmission characteristics vary with time.

Figures 2, 3:
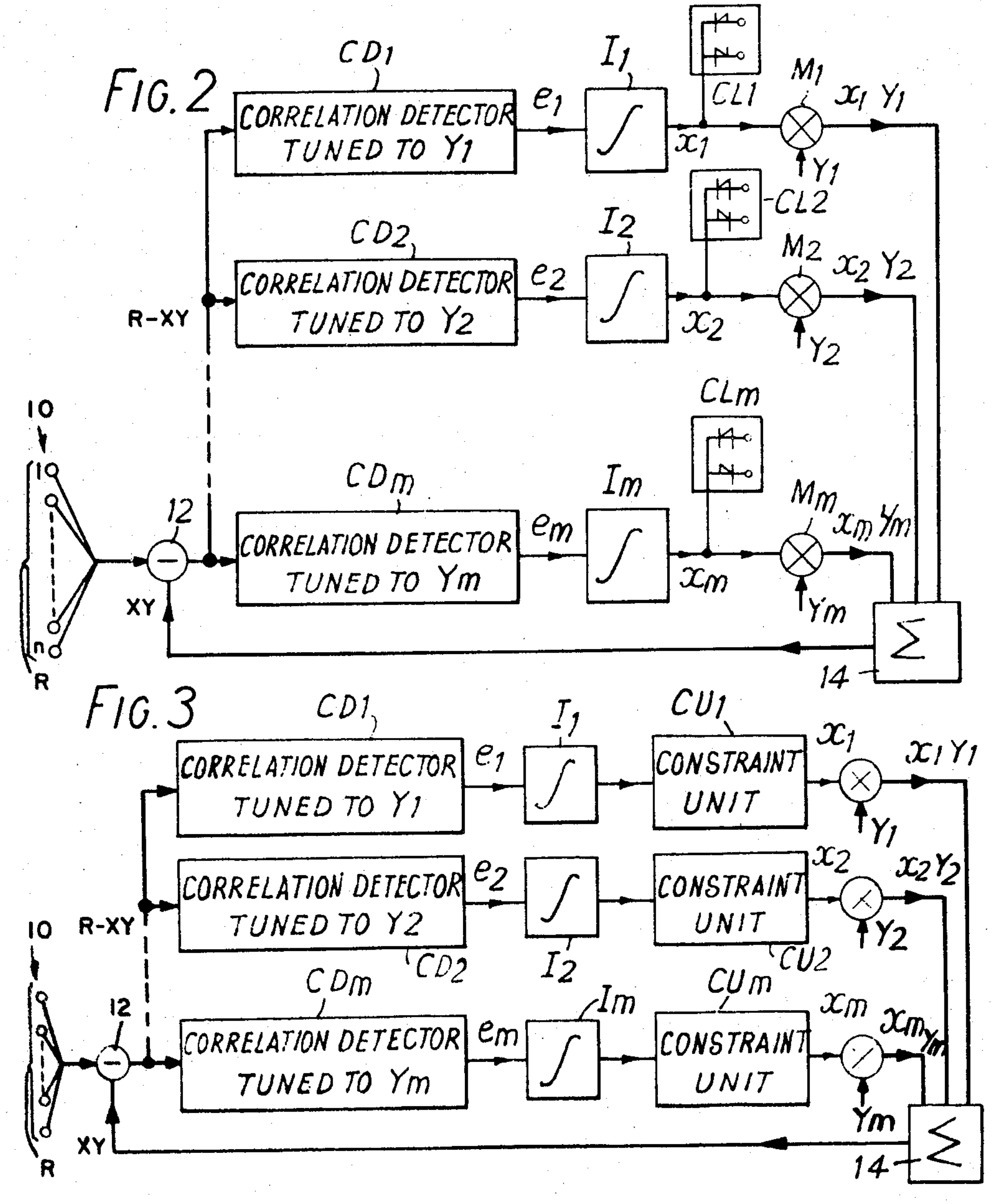
FIG. 2 is a block schematic diagram of an iterative detector for a digital transmission system in which signal elements are transmitted in $m$-element groups.
FIG. 3 is a block schematic diagram of another iterative detector similar to that shown in FIG. 2, but having constraint units instead of clamping circuits connected to the outputs of the integrators.

FIG. 2 shows a detection circuit in accordance with the invention arranged to operate by an iterative method. The detection circuit shown is for an $m$-element system and consequently uses $m$ correlation detectors. In FIG. 2, three of these detectors, CD1, CD2 andCD$m$ are shown.

The input signal on the $n$ terminals 10 is the $n$-component signal-vector $R$ which is the sum of $m$ signal-vectors $z_i Y_i$, for$i = 1, \ldots, m$, and a noise vector $W$. As before, each of the individual signals $z_iY_i$ is binary coded and such that the two values of $z_i$ have equal magnitudes $|z_i|$ but opposite signs. $Y_i$ is an $n$ component vector of unit length so that the magnitude or level of $z_i Y_i$ is given by $|z_i|$. $Y_i$ of course remains the same for the two binary values of $z_iY_i$.

The $n$ components of $R$ are applied to the inputs of the correlation detectors CD1 to CD$m$ via $n$ subtraction circuits 12. The output of each of the correlation detectors CD1 to CD$m$ is connected via a respective integrator I1, I2 . . . I$m$, the output of each integrator I1, I2, . . . I$m$ being the estimated value of the corresponding $z_i$. The output of each integrator I1, I2, . . . I$m$ multiplies the corresponding vector $Y_i$ in a respective multiplier M1, M2, . . . M$m$ whose $n$ output terminals are connected by an $n$-line highway to a summation circuit 14 whose $n$ outputs are in turn connected by an $n$-line highway to the second set of $n$, subtractive, inputs of the subtraction circuits 12.

In use, the outputs $x_1, x_2 \ldots x_m$ of the integrators I1 . . . I$m$ are initially all set to zero. Consequently the outputs of the multipliers M1 . . . M$m$ are also all zero so that the summation circuit 14 has all $n$ outputs zero. If a received signal-vector $R$ is applied to the $n$ terminals 10, it is passed on via the $n$ subtraction circuits 12 directly to the inputs of the correlation detectors CD1 . . . CD$m$. Consequently the $n$ outputs of the summation circuit take up a set of non-zero values $XY$ of steadily increasing magnitudes. The $n$ input signals to the correlation detectors are now $R-XY$. $R$ is an $n$-component row-vector and $Y$ is an $m \times n$ matrix whose ith row is the $n$-component unit-length row-vector $Y_i$, and X is an $m$-component row-vector whose $i$th component is $x_i$. It is assumed that the $m$ signals $Y_i$ are linearly independent, so that the matrix $Y$ is of rank $m$. This ensures the "convergence" of the iterative process to the correct solution vector X. Each correlation detector is tuned to a respective signal $Y_1 \ldots Y_m$ which signals are not normally orthogonal, so that there is cross-correlation between some or all of the signals. A change in the output of any one of the integrators I1 . . . I$m$ results in changes in the outputs of some or all of the correlation detectors, leading to further changes in the outputs of some or all of the integrators I1 . . . I$m$.

In due course a steady state condition is achieved in which the output of each of the correlation detectors CD1 . . . CD$m$ is at zero and the output of each of the integrators I1 . . . I$m$ has one of the two constant values corresponding to the two possible binary values of the received signal-element to which the corresponding detector is tuned. Thus when there is no noise in the received signal, $x_i = z_i$ for $i = 1, \ldots, m$.

In accordance with a feature of the invention a respective clamping unit CL1, CL2 . . . CL$m$ is provided for each correlation detector CD1 . . . CD$m$ and arranged to prevent the output of the associated one of the integrators I1 . . . I$m$ from departing from predetermined limits. In the preferred arrangement for this and all the following iterative detection processes using clamps, the magnitude of each $x_i$ is not permitted to exceed the magnitude of the corresponding $z_i$. This results in a significant increase in tolerance to additive noise over the corresponding arrangement without clamps, but the rate of convergence is slightly reduced.

FIG. 3 illustrates an alternative arrangement in which the clamping circuits CL1, CL2 . . . CL$m$ are replaced by constraint units CU1, CU2 . . . CU$m$ which allow the signals $X_1 \ldots X_m$ respectively to have one of two values only. Although the use of constraint units requires that the signals $z_iY_i$ satisfy more restrictive conditions than linear independence, if correct operation of the iterative process, that is convergence, is to be obtained; where convergence is obtained the rate of convergence is much greater than that where no constraint units are used.

The output signal of a constraint unit is initially held at zero volts. After a given interval of time its magnitude is increased from zero to that of the output signal from the associated correlation detector at the start of an iterative process and in the absence of noise and cross-correlation effects from the other received signal elements. It has the same sign as the output signal from the associated correlation detector.

The operation of the circuit shown in FIG. 3 is otherwise similar to that of the circuit shown in FIG. 2 and will therefore not be described in detail.

Figure 4:
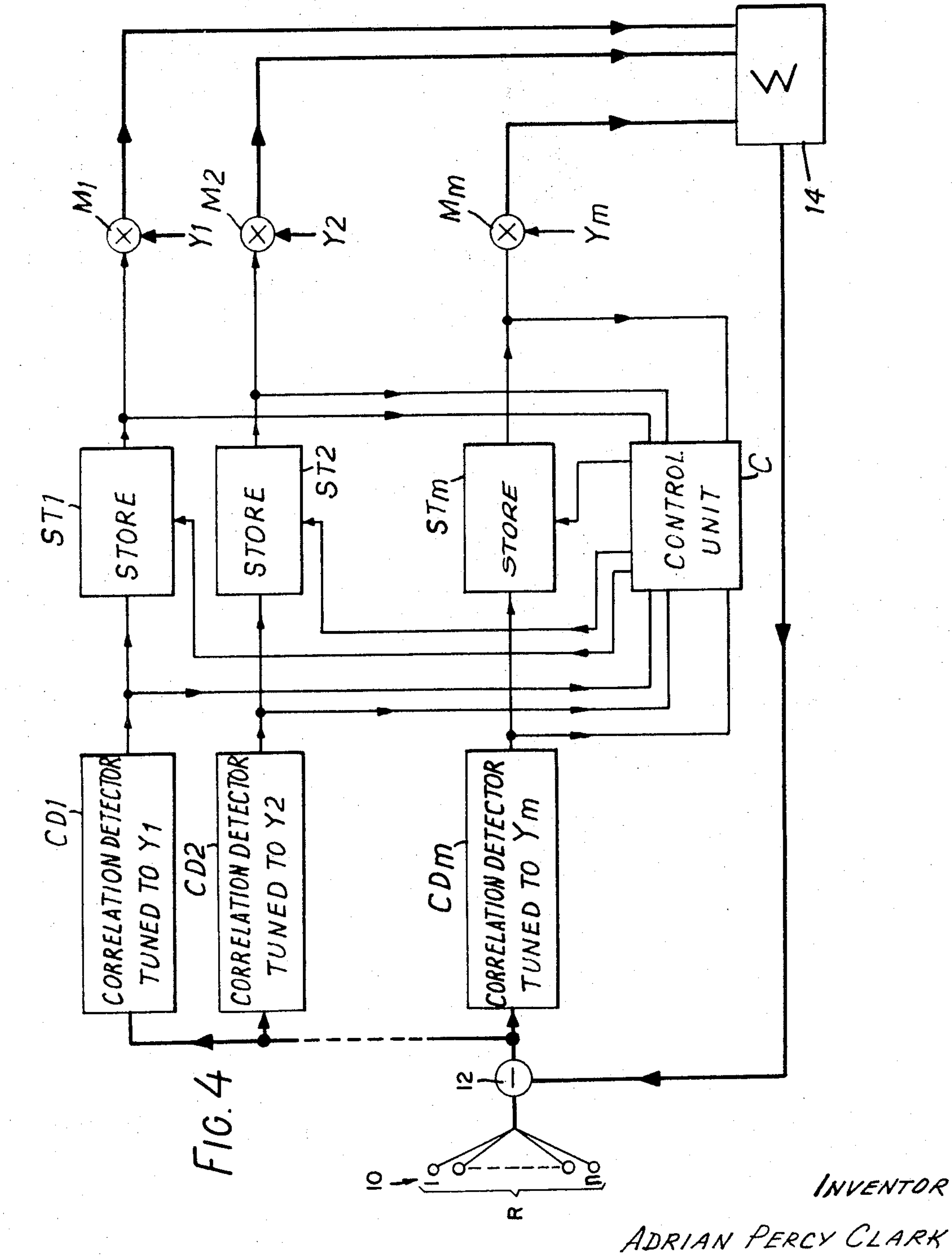
FIG. 4 is a block schematic diagram of a further iterative detector similar to that shown in FIG. 2, but having the integrators replaced by stores.

FIG. 4 shows an alternative detection circuit which is similar to that shown in FIG. 2 except that the integrators I1, I2 . . . I$m$ of FIG. 2 are replaced by stores ST1, ST2 . . . ST$m$ respectively. In addition, the clamping units CL1 . . . CL$m$ are not shown. These may be provided if desired. Alternatively, constraint units such as the units CU1 . . . CU$m$ shown in FIG. 3, may be provided.

The iterative detection processes now to be described will generally converge so long as the received signals $z_iY_i$, for $i = 1, \ldots, m$, are linearly independent and so long as the recommended arrangements are used. This applies where clamps are used at the output of each store or where the output signals from the stores are unconstrained. It does not apply where constraint units are used. In the latter case the received signals must satisfy more restrictive conditions than linear independence if convergence is to be ensured, but the rate of convergence is now very much greater than that where constraint units are not used. The use of clamps generally gives a useful improvement both in the tolerance to additive noise and in the rate of convergence, over the corresponding arrangement in which the output signals from the stores are unconstrained. It also enables convergence to be obtained with certain received signals $z_iY_i$ which are not linearly independent and which would not be correctly detected without clamps.

Wherever clamps or constraint units are used it is assumed that the receiver has prior knowledge of the received signal levels $|z_i|$, for $i = 1, \ldots, m$ although tests have shown that correct operation of such iterative processes is not in general critically dependent on a very accurate knowledge of these levels. It is of course assumed in all the iterative detection processes considered here that the receiver has prior knowledge of the $m$ signal-vectors $\{Y_i\}$, for $i = 1, \ldots, m$.

The signals at the inputs to the multipliers M1, M2 . . . M$m$ are the detector output signals $x_1, x_2 \ldots x_m$ respectively. In all the arrangements to be considered here, the values of $x_1, x_2 \ldots x_m$ are set to zero at the start of the iterative detection process. At the end of the detection process, the values of $x_1, x_2, \ldots x_m$ are the estimated or detected values of $z_1, z_2 \ldots z_m$ respectively, as in the iterative processes previously described.

The stores ST1 . . . ST$m$ operate under the control of a control unit C. In response to a respective signal from the control unit C, each store can be arranged to provide an output signal whose new value differs from the previous value by some function of the input received thereto from its associated correlation detector at the instant when the control signal is applied. This output signal is maintained until a subsequent control signal is applied. The detector can be used to perform various detection processes which will be described hereinafter. In all the detection processes, the circuit operates in a similar manner to that illustrated in FIG. 2 except that, instead of changes in the input to the summation circuit 14 taking place continuously, they take place in step-by-step manner under control of the control unit. In other words, the detector takes up a steady state after each change has been made and before a subsequent change is made.

According to one detection process which can be used with the detection circuit shown in FIG. 4, the control unit C is arranged to wait until the outputs from the multipliers M1 . . . M$m$ reach a steady value and then simultaneously apply control signals to all stores ST1 . . . ST$m$. Thus, all the outputs from the stores change simultaneously and the adjustment procedure to determine the detected element values for the $m$ signal-elements, as given by the values of $x_1, x_2 \ldots x_m$ at the end of the detection process, is carried out in distinct separate steps, each involving all $m$ signal-elements.

The change in the output signal from each store, at the instant when the control signal is applied, is preferably a fixed small fraction of the input received thereto from the associated correlation detector. This ensures that convergence is obtained whenever the individual received signals $z_i Y_i$, for $i = 1, \ldots, m$, are linearly independent. Clamps such as the clamps CL1 . . . CL$m$ of FIG. 2 may be connected after the respective stores. These give an improved tolerance to additive noise but a slightly lower rate of convergence. Constraint units should not be used with this arrangement.

According to another method of using the detection circuit shown in FIG. 4, control signals are supplied from the control unit to each of the stores ST1 . . . ST$m$ sequentially and in a fixed cycle. Thus, the change in output of each of the stores ST1 . . . ST$m$ takes account of changes already made in the outputs of the other stores. Either clamps such as the clamps CL1 . . . CL$m$ of FIG. 2 or constraint units such as the constraint units CU1 . . . CU$m$ of FIG. 3 may be employed, each of these being connected after the respective store. The change in the output signal from each store, at the instant when the control signal is applied, is preferably equal to the input received thereto from the associated correlation detector, except where the clamps are used, when it is preferably about 1½ times the input signals. It has been found that the use of clamps is particularly beneficial with this detection method. Constraint units are however not recommended here, since, when these are used, convergence is only obtained with a very limited class of received signals.

In another detection process, at the beginning of each cycle, the correlation detector and associated store, the sum of whose output signals has the largest magnitude, are determined and a control signal is supplied from the control unit C to this store so that the output thereof changes. Next a fresh determination of the correlation detector and associated store having the largest combined output is made and a control signal applied to this store. The process is continued throughout the cycle, the correlation detector and associated store having the largest combined output being selected from amongst those in respect of which a change has not been made in the current cycle. Thus, only one control signal is applied to each of the stores ST1 . . . ST$m$ during each cycle. The change in the output signal from a store, at the instant when the control signal is applied, is preferably such as to reduce to zero the output signal of the associated correlation detector. Clamps such as the clamps CL1 . . . CL$m$ of FIG. 2 may be used with this method. However, if it is desired to use constraint units such as the constraint units CU1 . . . CU$m$ of FIG. 3, some change in the method of operation is necessary. In this case, the output signal from a constraint unit, following the application of a control signal, is of a fixed magnitude and of sign such as to reduce to zero the output signal from the associated correlation detector in the absence of noise and cross-correlation effects from the other received signal-elements. In the first detection cycle its sign is the same as that of the output of the associated correlation detector, immediately preceding the application of the control signal. If the output signal from the correlation detector is zero, the sign is chosen at random. In subsequent detection cycles, if the output of the correlation detector is of opposite sign to the sign of the output of the constraint unit and is of magnitude greater than that to which the constraint unit is set, then the sign of the output signal of the constraint unit is changed. If the sign differs but the magnitude is equal to that to which the constraint unit is set, then the sign of the output signal of the constraint unit is chosen at random. In all other cases, the output signal of the constraint unit is left unchanged.

According to another detection process which can be carried out on the circuit shown in FIG. 4, the correlation detector having the largest positive or negative output is located and a control signal supplied to its associated store so that the output of the store changes. Thereafter a fresh determination of the correlation detector having the largest output is made. No restrictions are placed on the choice of correlation detector having the largest output and consequently the process is non-cyclic. The change in the output signal from a store, at the instant when the control signal is applied, is preferably such as to reduce to zero the output signal of the associated correlation detector.

A modification of the last described method can be used if the receiver is provided with clamps such as the clamps CL1 . . . CL$m$ of FIG. 2. Instead of choosing the correlation detector having the largest output on each occasion, the correlation detector whose output differs most from that of its associated store within the range of values permitted by the clamps, is chosen. Thus, instead of effecting a change relating to the correlation detector having the largest output, the change effected is the biggest one which can be made.

If constraint units such as the units CU1 . . . CU$m$ of FIG. 3 are provided, modification is necessary. In this case, the rules for determining which store is to have a control signal supplied to it areas follows. For each correlation detector, if the output from the associated constraint unit is zero, the output of the correlation detector with its sign changed, if necessary to make it positive, is the signal to be considered. If the output from the constraint unit is not zero, the output of the correlation detector is multiplied by the product of the sign of the constraint-unit output and minus one and the resulting signal treated as the signal to be considered. Of the signals to be considered, the one having the most positive value is located and a control signal supplied to the corresponding store. The iterative process automatically terminates when all the constraint-unit output signals are non-zero and when, of the signals to be considered, the one having the most positive value is smaller in magnitude than that to which the constraint unit is set. This magnitude is the same as that in the arrangement with constraint units previously described.

In the iterative detection processes, where the sequence of the stores to which control signals are applied is not fixed but is dependent on measured signal values, an improved performance may often be obtained if, for $i = 1, \ldots, m$, the correlation detector tuned to $Y_i$ is replaced by a correlation detector tuned to $|z_i| \cdot Y_i$, where $|z_i|$ is the magnitude of $z_i$. Where no constraints are applied to the output signals from the stores, the change in the output signal from the $i$th store, when the control signal is applied, is now preferably $(1/|z_i|)$ times the input received thereto from the associated correlation detector, instead of being equal to the latter. This maintains the condition that the change must be such as to reduce to zero the output signal of the associated correlation detector. In the detection process where the sum of the output signals from a correlation detector and its associated store must be determined for each of the $m$ correlation detectors, the sum of the output signal from the$i$th correlation detector and $|z_i|$ times the output signal from the associated store must now be determined, for $i = 1, \ldots, m$. In any detection cycle the control signal is applied to the store which is associated with the largest sum among those stores to which a control signal has not yet been applied to that cycle. In the noncyclic detection process using clamps, the store to which a control signal is applied, say the$i$th, is that whose input signal, clamped to permit values only within a range $\pm |z_i|$, would, if then multiplied by $|z_i|$, give the largest change at the application of the control signal. In either of the two detection processes here using constraint units, the magnitude of the threshold level with which the output signal of a correlation detector (say the$i$th) is compared in order to determine whether or not to change the sign of the output signal of the associated constraint unit, is now $z_i^2$ instead of the value $|z_i|$ previously used. The magnitude to which the constraint unit is set is $|z_i|$, as before.

In another detection process which can be carried out using the detector shown in FIG. 4, control signals are applied to the various stores ST1 . . . ST$m$ cyclically an in a fixed order. For each correlation detector CD1 . . . CD$m$, the magnitude of the output of the correlation detector is compared with the product of a positive constant, which is very much less than one, and the magnitude of the output expected from the correlation detector, when there are no signals subtracted from the received signal R and no cross-correlation products from the other individual signals $z_iY_i$. If the magnitude of the output of the correlation detector is less than this value, no change is made in the output of the associated store and therefore in the signal supplied to the summation circuit 14. Otherwise, a change is made in the output of the store equal in magnitude to the product of the expected output signal of the correlation detector, when there are no signals subtracted from R and no cross-correlation products, and a second positive constant greater than the previous positive constant but still much less than one. The change in the output of the store has the same sign as the output of the correlation detector. If desired, clamps such as the clamps CL1 . . . CL$m$ of the circuit shown in FIG. 2 may be provided.

The last described process may be modified in the following way. Immediately after each step of the previously described process, a determination is made of the sign of the output from the store whose output has just been changed. A signal equal in magnitude to the product of the expected signal at the input to the store, when there are no signals subtracted from the received signal R and no cross-correlation products, and a positive constant very much smaller than the constants previously considered, is added to the output from the store. The sign of this added signal is the same as that of the output from the store before the addition. If this output is zero, the sign is chosen at random. Thus, immediately after a stored signal has been changed in the manner prescribed by the previous detection process, its magnitude is always increased by a fixed small amount, except of course when prevented by the clamps.

Figure 5:
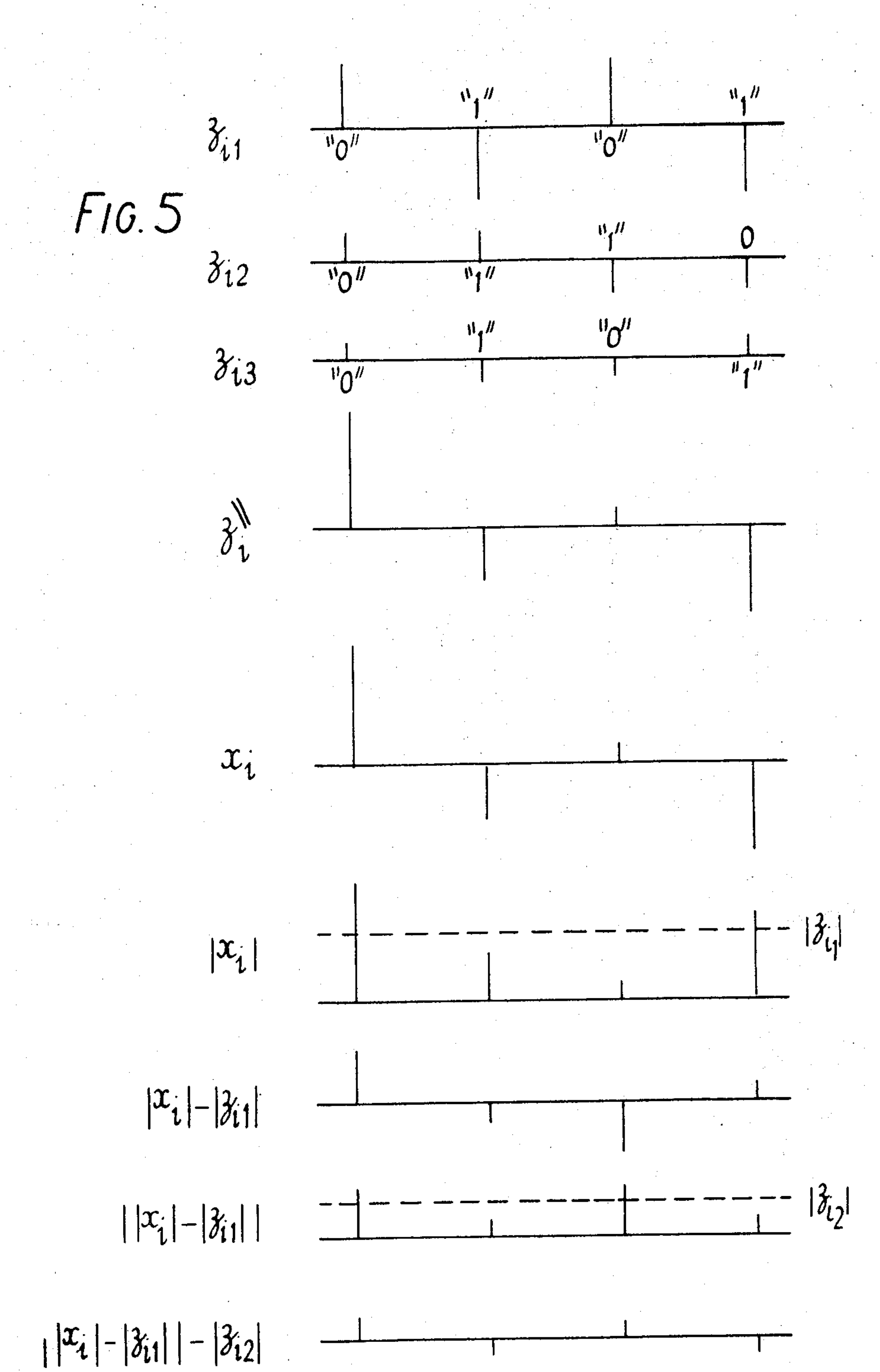
FIG. 5 is a waveform diagram illustrating a multilevel signal which may be used instead of a binary signal in a digital transmission system of the type concerned.

FIG. 5 illustrates a multi-level signal which is suitable for use in place of the binary signal $z_i$, for $i = 1, \ldots, m$, in the arrangements previously described, except that the constraint units cannot now be used. It meets the requirement that equipment complexity shall rise linearly with the number of binary signal-elements. $z_i$, for $i = 1, \ldots, m$, is now a $2^v$ — level signal and comprises the sum of $v$ binary signals $z_{i1}, z_{i2} \ldots z_{iv}$. The $i$th signal-element in a group of $m$ is $z_iY_i$ and comprises the sum of $v$ binary signals $z_{i1}\,Y_i, z_{i2}\,Y_i \ldots z_{iv}\,Y_i$. FIG. 5 shows the signals $z_{i1}$, $z_{i2}$ and $z_{i3}$ required to transmit successively four binary code groups 000, 111, 010 and 101. It is assumed that they are transmitted by the $i$th element in each of four successive groups of $m$ elements. The signal $z_{i1}$ is associated with the first digit of each group $z_{i2}$ with the second digit and $z_{i3}$ with the third digit. It will be seen that for the first digit of each group, a positive signal represents a "0" and a negative signal of equal magnitude represents a "1." For the second digit, the magnitude of the signals is half that for the first digit, a signal of the same polarity as that for the corresponding first digit representing a "0" and a signal of a opposite polarity representing a "1." Similarly, for the third digit of each group, the magnitude of the signals is half that for the second digit and a signal of the same polarity as that for the second digit represents a "0" while a signal of the opposite polarity represents a "1." The signal $z_i$ is the sum of $z_{i1}$, $z_{i2}$ and $z_{i3}$, the four different values of $z_i$ shown in FIG. 5 corresponding to four different element values of the eight-level signal element $z_iY_i$. It will be realized, that with this arrangement, the spacing between adjacent significant values of each $z_i$ is uniform. The signal $x_i$ represents the detected value of $z_i$, determined in a suitable iterative process. It will be seen that corresponding signals $x_i$ and $z_i$ are identical indicating that there is no noise in the received signal. It is assumed that the receiver has prior knowledge of the received signal-level, so that the values of $|z_{i1}|$, $|z_{i2}|$ and $|z_{i3}|$ are known. The binary values of $z_{i1}$, $z_{i2}$ and $z_{i3}$ in the ith signal-element of a received group of m elements, are determined as follows. The polarity of a signal $x_i$ is determined. This indicates the first digit. Next, the modulus (magnitude) of the signal $x_i$ is determined, and $|z_{i1}|$, the modulus of the signal indicating the first digit, is subtracted from it. The polarity of the resulting signal indicates the second digit. Finally the modulus of this signal is determined and $|z_{i2}|$, the modulus of the signal indicating the second digit, is subtracted from it. The polarity of the resulting signal indicates the third digit. These three steps can of course be arranged to take place simultaneously.

In the above description, a single receiver may be fed from $m$ transmitters, each of which contributes one of the signal elements in a group of $m$. The transmitted signals are synchronously multiplexed to be in element synchronism. Since each of the $m$ received signal-elements originates from a different transmitter and is identified from the other received elements by means of its characteristic waveform ($n$ sample values), the arrangement may clearly be used as a random access discrete address system. In this case the number of multiplexed signal-elements, $m$, will vary with time but the channel transmission-characteristics can be assumed to introduce negligible signal-distortion. An additional and separate transmission channel, connecting all transmitters to the receiver, is now required so that the receiver, can be informed of the number of active transmitters together with the corresponding $\{Y_i\}$.

Where a given set of $m$ transmitters feed a single receiver over a common baseband channel, whose transmission characteristics may vary slowly with time, the detector clearly knows the value of $m$, but suitable training signals must now be sent from all transmitters, both at the start of transmission and at regular intervals interspersed between the data signals, so that the receiver can maintain a reasonably accurate knowledge of the $\{Y_i\}$, which may of course here vary slowly with time.

Perhaps the most important application of the various iterative detection processes, and that which will now be considered, is that where a single transmitter feeds a single receiver over a slowly time-varying baseband channel.

In the conventional arrangement of a digital transmission system operating over a slowly time-varying baseband channel, a transversal filter is inserted at the input to the detector and is used to equalize the channel transmission-characteristics. The filter characteristics are adjusted adaptively. The transmitter feeds a continuous serial stream of data elements over the channel and the detector samples each received signal-element and determines its element value directly from the sampled voltage.

The adaptive equalizer acts essentially as a filter and is both simple and effective. However, the arrangement has three limitations. Firstly, for certain transmission characteristics, the channel cannot be equalized. Secondly, only approximate equalization can normally be achieved with a finite transversal filter. Thirdly, in order that the filter may adapt itself to variations in the channel transmission characteristics during the transmission of data, without the transmission of special training signals, the sequence of data element values must be reasonably random.

The arrangement of adaptive detection, which will presently be described, overcomes all three disadvantages of the transversal equalizer.

Figure 6:
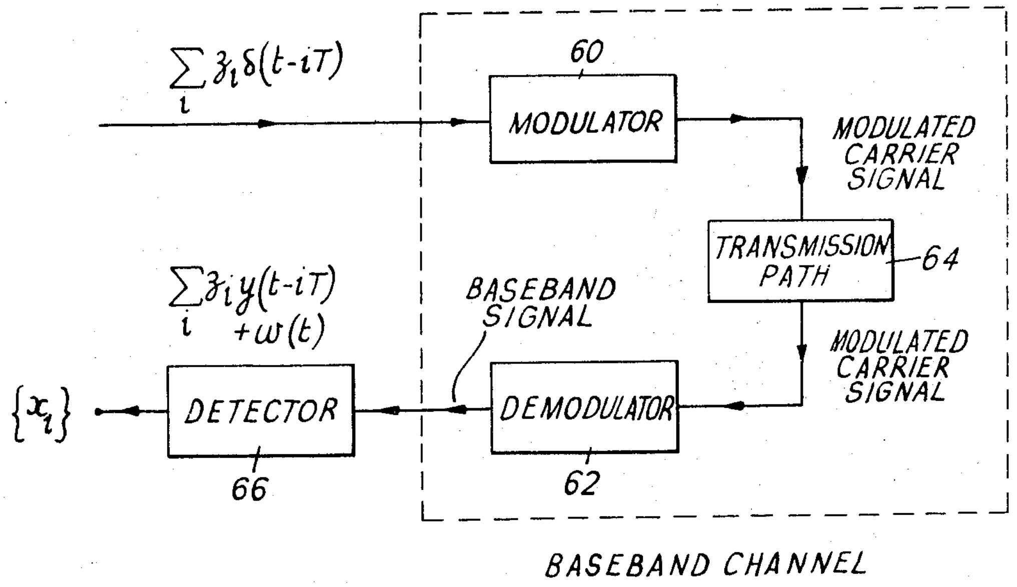
FIG. 6 is a block schematic diagram of a digital transmission system, illustrating an application of the present invention.

Consider a synchronous serial data-transmission system as shown in FIG. 6. The input signal is a series of impulses $\{z_i\,\delta(t-iT)\}$ spaced at regular intervals of $T$ seconds, where $\delta(t)$ is a unit impulse at time $t=0$. Each impulse is a signal element. The elements are binary bipolar and have unit magnitude (area), so that for and integer $i$, $z_i$ is 1 or $-1$.

The input to the modulator 60 contains a low-pass filter to produce a baseband signal which is then used to modulate the carrier. The modulated-carrier signal may be a suppressed-carrier a.m. signal and the demodulator 62 is a coherent detector whose output is a baseband signal. The modulator 60, transmission path 64 and demodulator 62 are assumed to be linear.

When no signal distortion is introduced in the transmission path, the nominal bandwidth of the base band signal at the detector input is $(1/2T)$ Hz. The base band signal is sampled at regular intervals of $T$ seconds in the detector 66. The detector 66 operates entirely on these sample values and its function is to obtain the best estimates $\{x_i\}$ of the transmitted $\{z_i\}$. The correct sampling instants are determined by a timing signal suitably synchronized to the received baseband signal.

It may readily be shown that the modulator 60, transmission path 64 and demodulator 62 are equivalent to a linear baseband-channel. Suppose this has an impulse response $y(t)$. Where the transmission path is an h.f. radio link, $y(t)$ may vary slowly with time. Where it is a switched telephone circuit, $y(t)$ will in general differ from one transmission to the next but will not usually vary much during any one transmission. Except where otherwise stated, it will be assumed that the baseband channel is a slowly time-varying channel. The data signal at the detector input is clearly $$\sum_i z_i y(t-iT)$$

The transmission path 64 introduces additive noise over the signal frequency band, giving the noise waveform $w(t)$ added to the data signal at the detector input.

It is assumed that the various filters in the modulator 60 and demodulator 62 are designed so that, when there is no signal distortion in the transmission path, then there is no intersymbol interference at a sample value of the baseband signal in the receiver.

The present invention is concerned with the method in which the detector should use the sample values of the received baseband signal, in order to obtain the best compromise between performance and equipment economy, in those applications where the transmission path may introduce severe signal distortion. Thus in the arrangement of FIG. 6 we are only concerned with the design of the detector.

Where the baseband channel introduces negligible intersymbol interference in the sampled values of the signal elements at the detector input, the optimum detector determines the binary value of each element from the sign of the corresponding sample value. Where there is appreciable intersymbol interference, such an arrangement is no longer optimum and may not even operate correctly in the absence of noise. A suitable transversal equalizer may, of course, be inserted at the input to the detector in order to reduce the intersymbol interference to an acceptable level.

The arrangement which will now be described does not attempt to equalize the channel, but uses instead an adaptive detector which accepts the distorted signal-elements as they are and performs a near-optimum detection process on these.

Suppose that with the most extreme time-dispersion of the received signal, a signal element can cause interference in the sample values of some or all of the $p$ immediately preceding elements and in some or all of the $q$ immediately following elements. The element stream is then divided into separate groups, each containing m consecutive elements which carry the transmitted data. Each group of $m$ elements is separated from the following group by $g$ elements, which are set to zero and act as a time guard band between the adjacent groups. Also $$g=p+q$$

Associated with a group of $m$ data elements there are $$n=p+m+q=m+g$$

consecutive sample values which are dependent on the particular group of data elements and independent of every other group. These $n$ sample values are used for the detection of the $m$ data elements. Clearly no data element in any one group can cause interference in the detection of an element in any other group, so that the different groups are orthogonal. Two groups of signal elements can be considered to be orthogonal when each of them produces no response in an optimum detection process on the other.

Over any baseband channel likely to be used in practice, the impulse response decays sufficiently rapidly, away from its central peak, so that no serious error is introduced by assuming a finite time-dispersion of a received signal-element, even though the time dispersion may theoretically be infinite.

Where the receiver has a fairly accurate prior knowledge of the $n$ sample values corresponding to each of the two binary values, for every one of the $m$ individual elements in a group, and where $m$ is not much greater than 10, then the optimum detection process determines which of the $2^m$ different combinations of the $m$ binary values gives a resultant set of n sample values having the minimum mean square difference from the received $n$ sample values. This detection process detects the sum of the m binary elements as a multi-level element having $2^m$ possible values. It minimizes the probability of error in the detection of the m binary elements, when the noise is additive white gaussian noise and the $\{z_i\}$ are statistically independent and equally likely to have either binary value. The disadvantage of the arrangement is that either the equipment complexity or the detection period is proportional to $2^m$. In addition, for correct operation the detector may require a fairly accurate prior knowledge of the received signal level.

In an alternative and preferable approach to the detection of the $m$ binary-elements in a group, the $m$ elements are again detected simultaneously in a single detection process, and the operation of the arrangement can be explained as follows.

If there is no intersymbol interference, the n sample values of the first signal-element in a group of $m$, are $$\overbrace{0\ldots0}^{p}\ \overbrace{z_1y_{p+1}0\ldots0}^{m}\ \overbrace{0\ldots0}^{q}$$

where $z_1$ is either 1 or −1 and carries the element binary value. $y_{p+1}$ depends upon the channel and may vary slowly with time.

If there is intersymbol interference, the $n$ sample values of the first element are $$\overbrace{z_1y_1z_1y_2\ \ldots\ z_1y_{g+1}}^{g+1}\ \overbrace{0\ \ldots\ 0}^{m-1}$$

where $y_j$ is the $j$th sample value of the first element when $z_1=1$.
Clearly $$g=n-m$$

and $$y_j=0 \text{ when } g+2 \leq j \leq n$$

$y_j$ must be non-zero for at least one value of $j$ in the range 1 to $g+1$, but it need not of course be non-zero for all $j$ in this range.

The sample values of the $i$ th signal-element in the group of $m$ are $$\overbrace{0\ \ldots\ 0}^{i-1}\ \overbrace{z_iy_1z_iy_2\ \ldots\ z_iy_{g+1}}^{g+1}\ \overbrace{0\ \ldots\ 0}^{m-i}$$

and the $n$-component row-vector $Y_i$ is now defined to be $$\overbrace{0\ \ldots\ 0}^{i-1}\ \overbrace{y_1y_2\ \ldots\ y_{g+1}}^{g+1}\ \overbrace{0\ \ldots\ 0}^{m-i}$$

for $i=1,\ldots,m$, so that the $i$ th signal-element is given by $z_i\ Y_i$. $z_i$ is of course a scalar and both $z_i$ and $Y_i$ are real. The binary value of the i th element is given by the sign of $z_i$, and $$|z_i|=1 \text{ for all } i$$

where $|z_i|$ is the magnitude of $z_i$.

The sum of the $m$ signal-elements in a group is $$\sum_{i=1}^{m} z_iY_i=ZY$$

where $Z$ is the row-vector $(z_1, z_2, \ldots, z_m)$ and $Y$ is the $m \times n$ matrix whose $i$ th row is $Y_i$. Clearly $Y_i$ is the first row $Y_1$ shifted to the right by $i-1$ places, so that any one row of $Y$ is a simple time-shift of any other.

It can readily be shown that the $m$ vectors $z_iY_i$ are always linearly independent. That is, no one of these can be expressed as a linear combination of some or all of the others. It can also be shown that $ZY$ has a different value for every different combination of the $m$ binary values and that the latter can always be uniquely determined from $ZY$, so long as the receiver has a prior knowledge of the $\{Y_i\}$ but not necessarily of the $\{|z_i|\}$.

Clearly, any of the detection processes of FIGS. 1,2 and 4 can be used to determine the values of the $\{z_i\}$ in a received group of m signal-elements and hence to determine the element binary values, provided only that the detector has prior knowledge of the $\{Y_i\}$.

The detection processes of FIGS. 2 – 4 have an important advantage over the process of FIG. 1 in that all the stored values used in the detection processes that is R and Y, can be derived directly from the received signal. Furthermore, in FIGS. 2 to 4 the $m$ vectors $\{Y_i\}$, used both in the correlation detectors and to multiply the $\{x_i\}$, are the appropriate $n$-component segments of a single stored vector $$L=\overbrace{0\ .\ .\ .\ 0}^{m-1}\overbrace{y_1y_2\ .\ .\ .\ y_{g+1}}^{g+1}\overbrace{0\ .\ .\ .\ 0}^{m-1}$$

where the $g+1$ potentially non-zero components of this vector appear in each of the $m$ vectors $\{Y_i\}$. Clearly the knowledge of any one of these vectors completely determines the rest.

The start of each transmission contains a training signal in which each group of $m$ elements has $$z_1=1$$

and $$z_i=0 \text{ for } i=2, \ldots, m$$

so that each group contains just the signal-vector $Y_1$. To reduce the effects of noise, many vectors $Y_1$ are transmitted consecutively and the average of the received vectors is used to give the stored value of L.

Where the impulse response of the channel does not vary over any one transmission, the value of L determined at the start may be used throughout the transmission, giving a simple and effective system.

With a time-varying channel, the vectors $Y_1$ of the training signal may be interspersed between the data signals at regular known intervals, so that the $\{Y_i\}$ in the detector may follow the changes in impulse response of the channel. This would however complicate the system and appreciably reduce the data transmission rate. A simpler and more effective arrangement is as follows.

Immediately after the detection of a group of $m$ signal-elements, the receiver has estimates of the values of the $\{z_i\}$. Assuming for the moment that these estimates are correct and that there is no additive noise in the received signal, the receiver now knows both $R = ZY$ and $Z$. The vector $Y$, can then be determined quite simply as follows.

Figure 7:
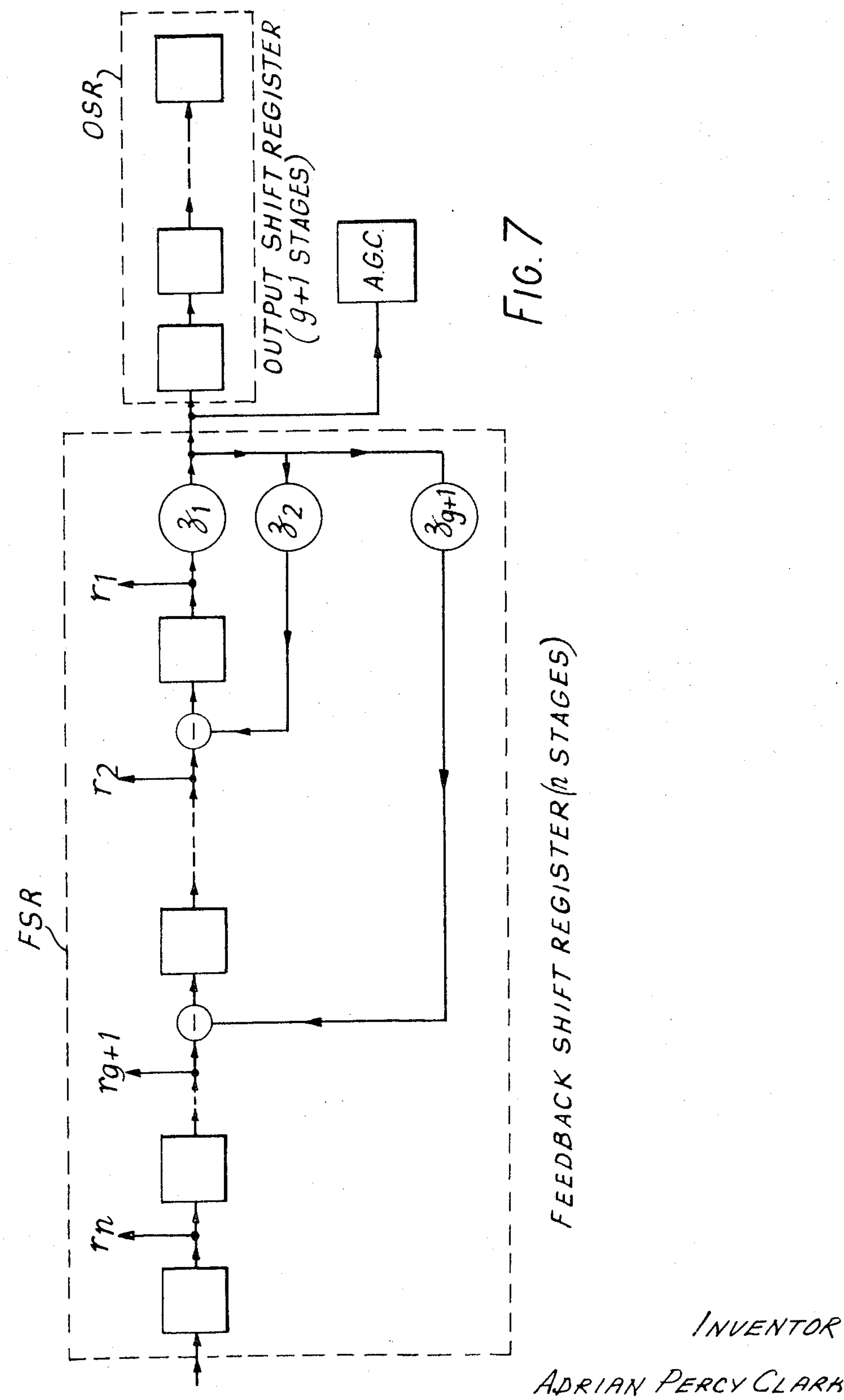
FIG. 7 is a block schematic diagram of apparatus for estimating the impulse response of the channel of a digital transmission system with which a detector in accordance with the present invention is being used.

Consider the arrangement shown in FIG. 7 A square here represents a stage of a shift register. It should be understood that each stage of the shift register is capable of storing a signal, which represents a number to an accuracy of at least 1 percent. When triggered the signal at the input to a stage is written into the store and thereby transferred to the output of the stage. The shift register may be arranged to handle signals either in analogue or in digital form.

FIG. 7 shows two shift registers, a feedback shift register FSR having $n$ stages and an output shift register OSR having $g+1$ stages. In the feedback shift register FSR, a respective feedback signal is subtracted from the input of each of the last $g$ stages. In FIG. 7 a circle containing the reference $z_i$ represents a switched inverter whose output signal is $z_i$ times its input signal, $z_i$ being 1, − 1 or zero. Thus, it will be seen from FIG. 7 that there is subtracted from the input to the ith from the last stage of the feedback shift register FSR, a signal equal to the output from the last stage multiplied by both $z_1$ and $z_{i+1}$ (where $i = 1 \ldots g$).

The use of the circuit shown in FIG. 7 to provide an estimate of $Y_1$ will now be described. It is assumed that, initially, the receiver has been provided with an estimate of $Y_1$ by means of a training signal, but that $Y_1$ varies with time. Immediately after the detection of a group of $m$ signal elements using one of the detection processes described with reference to FIG. 4, the receiver has estimates of the values of the components of $Z$ in the form of the values of the components of X at the end of the detection process. If these estimates have the correct signs, giving the correct detected values (± 1) of the $\{z_i\}$ and if there is no additive noise in the received signal, then, since the received signal $R$ equals $ZY$ and since $Y$ is fully determined by $Y_1$, a determination of $Y$ can be made.

Initially, all the signal voltages stored in the stages of the feedback shift register FSR and all $z_i$ in FIG. 7 are set to zero and the vector $R$ if fed into the feedback shift register FSR to the position shown, i.e. with the first element in the last stage and the $n$th element in the first stage. The detection process, using the FIG. 4 apparatus, is now carried out, and the switched inverters are then set to the appropriate values of $z_i$, as determined by the detection process. The two shift registers FSR and OSR are next triggered simultaneously $g+1$ times so that the first $g+1$ components of $Y_1$ are in the output shift register OSR. During this procedure, the following operations are taking place. (It is assumed that $g$ is less than $m$).

$$r_i=\sum_{j=1}^{i} z_jy_{i-j+1} \text{ for } i=1, \ldots, g+1$$

Thus, immediately before the two shift registers in FIG. 7 are triggered for the first time, the output signal from the feedback shift-register FSR is $$z_1r_1=z_1z_1y_1=y_1$$

and the input signals to the last $g$ stages of the feedback shift register are $$r_i-z_iy_1=\sum_{j=1}^{i-1} z_jy_{i-j+1} \text{ for } i=2, \ldots, g+1$$

starting with $i = 2$ at the last stage of the shift register. Clearly the component $z_iy_1$ has been eliminated from each inputs signal.

After the shift registers have been triggered for the first time, the output signal from the feedback shift-register FSR is $$z_1(r_2-z_2y_1)=z_1(z_1y_2+z_2y_1-z_2y_1)=y_2$$

and the input signals to the last $g-1$ stages of the feedback shift-register are $$r_i-z_iy_1-z_{i-1}y_2=\sum_{j=1}^{i-2} z_jy_{i-j+1} \text{ for } i=3, \ldots, g+1$$

starting with $i = 3$ at the last stage of the shift register. The components $z_i\ y_1$ and $z_{i-1}\ y_2$ have now been eliminated from each input signal.

After the shift registers have been triggered $k$ times (where $k<g$), the input signals to the last $g-k$ stages of the feedback shift-register FSR are $$\sum_{j=1}^{i-k-1} z_j y_{i-j+1} \text{ for } i=k+2, \ldots, g+1$$

starting with $i = k+2$ at the last stage of the shift register. The output signal from the feedback shift-register is now $y_{k+1}$.

The arrangement of FIG. 7 provides a simple means of determining the vector $Y_1$ from $R$. The vector $Y_1$, determined at the end of each detection process, is used to adjust the stored value of L, so that the $\{Y_i\}$ in the detector follow the variations in the impulse response of the channel.

When the vector $R$ contains additive noise, the circuit of FIG. 7 generates $Y_w$, a noisy estimate of $Y_1$. The circuit tends to accentuate the effects of additive noise in $R$ and can be seriously affected when there is an error in the setting of one or more of the $\{z_i\}$.

However, under normal conditions the variation of the impulse response of the channel should be slow enough to enable the $m$ th to $n$ th components of L to be given respectively by the first $g+1$ components of the running average of $Y_w$ over a number of these vectors so that the $\{Y_i\}$ in the detector are only slightly affected by the additive noise in $R$. Since the element error rate is normally less than say 1 in $10^4$, errors in the setting of the $\{z_i\}$ in FIG. 7 should not be important. The effect of such errors may of course be reduced by limiting the maximum change between successive values of each component of $Y_w$, or even by neglecting any $Y_w$ which shows an excessive change.

The arrangement just described enables the detection process to be used in a fully adaptive system. The training signal is still required at the start of each transmission, but once correct operation is obtained, the detector is held correctly matched to the channel during the transmission of data. The channel may vary slowly with time and any sequence of binary element values may be transmitted in the data signal without affecting the operation of the adaptive detector.

The length of the vector $Y_1$ is held approximately constant at a nominal value of unity, as follows. As $Y_w$ is fed into the output shift-register OSR of FIG. 7, its component values are squared and added to give an estimate of the squared length of $Y_1$. The running average of this estimate, taken over several successive vectors $Y_w$, is then used to control the gain of an automatic gain control unit AGC, which is located at the input of the demodulator (FIG. 6) and is here considered to be a part of the baseband channel.

Where the attenuation of the transmission path varies over a range of 40 or 50 db, an efficient a.g.c. system should hold the length of each $Y_i$ to within 1 or 2 db of unity. This not only avoids the risk of overloading in the receiver but, by greatly reducing the variations in the channel impulse-response, it improves the operation of the adaptive detector. Under these conditions it is reasonable to assume that the $m$ vectors $\{Y_i\}$, used in the detector, are normally the same as the corresponding vectors which make up the received vector $R$.

Figure 8:
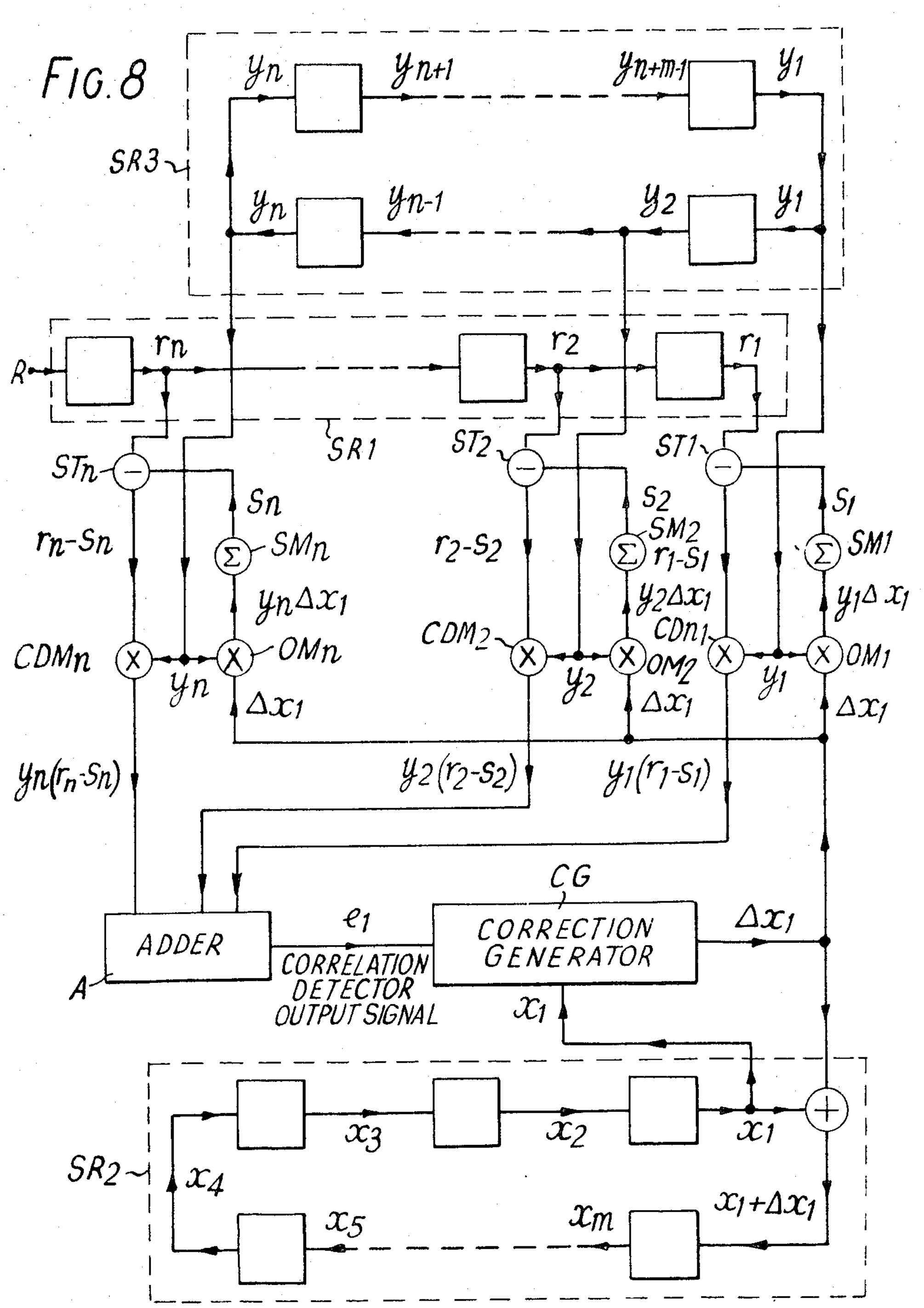
FIG. 8 is a block schematic diagram of an yet a further iterative detector which is basically similar to that shown in FIG. 4.

FIG. 8 illustrates a detector which is basically similar to that shown in FIG. 4 but which has certain differences which lead to a simplified construction. Any of the previously described iterative processes, in which the stored values of the $\{x_i\}$ are changed sequentially and cyclically and in the same order in each cycle, may be used here. In normal operation, each of three shift registers SR1, SR2 and SR3 stores a set of values in analogue or digital form, and when a shift register is triggered, the input signal to each of its stages is transferred to the output of that stage in the direction shown.

It is assumed here that a separate timing signal is transmitted continuously with the data signal, in order to hold the receiver in synchronism with the received data signal. The receiver generates both an element timing waveform, which samples the baseband signal at the detector input $n$ times for each group of $m$ signal-elements, and a group timing waveform, which indicates which of these sample values is the first in a group of $n$.

At the start of transmission, a training signal is transmitted for 2 or 3 seconds. This contains a continuous sequence of the signal-vectors $Y_1$, exactly as previously described. Once synchronization has been established at the receiver, the signals $\{y_i\}$ in the shift-register SR3 are set to zero and the average of say the next 100 received vectors $Y_1$ is then stored in the shift register SR3 in the position shown. The mechanism for doing this is not shown in FIG. 8.

While one vector $R$ is stored in the shift-register SR1, the next vector $R$ is being received in another store not shown in FIG. 8 so that the processing time available for a received vector $R$ is equal to its transmission time. During any operation upon the stored vector $R$ in FIG. 8, it is always held in the position shown.

Instead of the $m$ correlation detectors in FIG. 4 a single correlation detector is provided in FIG. 8 and used for each signal-element in turn. The stores ST are replaced by a shift register SR2 which is triggered on each occasion when one of the values $x_1$ to $x_m$ is allowed to change. Thus, the particular $x$ which is to change is always held in the same stage of the shift register SR2.

A shift register SR3 having $n + m - 1$ stages and similar to the shift register SR2 in that it is connected in the form of a ring, is provided to store the values of $Y_1$. It will be realized that, since $Y_2$ is equal to $Y_1$ with its non-zero components shifted forward by one place, the components of $Y_2$ can be extracted from the same respective stages of the shift register SR3 as the corresponding components of $Y_1$ provided that the shift register is first triggered once.

An individual subtraction circuit ST1 to ST$n$ is provided for the output of each stage of the shift register SR1, and a separate summing circuit SM1 to SM$n$ is provided for each of the subtraction circuits ST1 to ST$n$, equivalent to the subtraction circuit of FIG. 4. The second input to each of the subtraction circuits ST1 to ST$n$ is connected to the output of a respective summation circuit SM1 to SM$n$ which together replace the stores ST1 to ST$m$ and the adder of FIG. 4. The output of each of the subtraction circuits ST1 to ST$n$ is fed to a respective multiplier CDM1 to CDM$n$. These multipliers together with the adder A form a correlation detector. The other input to each of the multipliers is fed with a respective signal $y_1$ to $y_n$ from the shift register SR3. The outputs of the multipliers CDM1 to CDM$n$ are fed to an adder A the output of which is the correlation detector output signal. This output signal is fed to a correction generator CG. The correction generator CG also receives one of the components $x_i$ from the shift register SR2 and produces an output signal indicative of the change in the value of $x_i$ which must be made. This signal is fed to each of a plurality of output multipliers OM1 to OM$n$ where it is multiplied by each of the values $y_1$ to $y_n$ respectively and fed to the corresponding summation circuit SM1 to SM$n$. The signals $\{y_i\}$ stored in the first n stages of the shift-register SR3 are of course shifted at each step of the iterative process.

At the beginning of a detection process, a vector R, corresponding to a group of m data elements is fed into the shift register SR1. Initially, the vector $Y_1$ in the shift register SR3 is set to the position shown in FIG. 8. The signal stored in the summing circuits SM1 to SM$n$, which is a vector S, is set to zero. The output signal from the correction generator CG and the vector $X$, stored in the shift register SR2 are also set to zero. Each component of the vector $S$ is now subtracted from the corresponding component of the vector $R$ in the subtraction circuits ST1 to ST$n$ and each component of the resultant vector $R$–$S$ is multiplied by the corresponding component of the vector $Y_1$ in the multipliers CDM1 to CDM$n$. The $n$ products are then added in the adder A to give the correlation detector output signal. The appropriate correction signal $\Delta x_1$ is now determined according to the particular iterative detection process in use.

$\Delta x_1$ is then added to $x_1$ in the shift register SR2. ($x_1$ is of course at this time zero). $\Delta x_1$ is also supplied to the output multipliers OM1 to OM$n$ where it is multiplied with each component of the vector $Y_1$. Thus $S$ is now $\Delta x_1 Y_1$. and CDM1 and the signal The shift registers SR2 and SR3 are now triggered simultaneously so that each of the values stored is shifted one place in the direction shown by the arrows in the drawing. The shift register SR3 thus presents the vector $Y_2$ to the multipliers OM1 to OM$n$ and cpm1 to CDM$n$ and the signal $x_2$ (at this time zero) is fed to the correction generator.

The change $\Delta x_2$ is now determined by following the same procedure as that which was used to determine the change $\Delta x_1$. Thus, $S$ is now equal to $\Delta x_1 Y_1 + \Delta x_2 Y_2$. At this time, $x_1 = \Delta x_1$ and $x_2 = \Delta x_2 \cdot x_i = 0$ for $i$=3, . . . ,$m$.

The detection process continues, on each occasion adding a term $\Delta x_i Y_i$ to $S$. Thus, it will be realized that $S = XY$.

The shift registers SR2 and SR3 are repeatedly triggered and the process continues as described until a change has been made in the stored value of each $x_i$ so that the first cycle of the iterative detection process has been completed. At the start of the next cycle, signals stored in the shift register SR2 are already in the correct positions (as shown in FIG. 8) but the signals in the shift register SR3 require to be reset to the position shown in FIG. 8. This is because the shift register SR3 has $n$–1 more stages than the shift register SR2.

After a predetermined number of iterative cycles, the receiver examines the signs of the components of the vector $X$ stored in the shift register SR2 and allocates the appropriate binary values to the corresponding signal elements.

The vector $R$ in the shift register SR1 is now replaced by the next vector $R$ and the whole detection process repeated. During any one detection process, no changes are, of course, made to the values of the components of the vectors $Y$ and $R$ stored in the shift registers SR3 and SR1 respectively.

As already mentioned, the circuit of FIG. 7 may be used to update the estimate of $Y_1$. If this is to be done, the feedback shift register FSR of FIG. 7 is used as the shift register SR1. At the end of each detection process, the values of the $\{z_i\}$ in FIG. 7 are set to the appropriate detected values, which may in each case be $\pm1$, and the shift registers FSR (SR1) and OSR are triggered simultaneously $g + 1$ times, as already described. The resulting estimate of $Y_1$ is used to adjust the values of $Y_1$ stored in the shift register SR3 so that variations in the impulse response of the channel are followed.

It will be appreciated that a circuit of FIG. 8 uses only one correlation detector and 2$n$ multipliers. It is therefore considerably less complex than the equivalent arrangement according to FIG. 4.

A considerable reduction in the level of additive noise in the estimate of $Y_1$ may be obtained through the use of an iterative process to estimate $Y_1$, in place of the arrangement of FIG. 7. This should enable the adaptive detector to follow more rapid variations in the channel impulse-response, for the same level of additive noise in the received signal.

After a detection process, the receiver can be assumed to know the $\{z_i\}$ with only a small probability of error. Thus an iterative detection process using the circuit of FIG. 8 can now be used to obtain an estimate of the $\{y_i\}$ and hence of $Y_1$, by employing the detected values of the $\{z_i\}$.

Consider the iterative process of FIG. 8 when modified to estimate $Y_1$. In the shift-register SR3, $y_i$ is replaced by the detected value of $z_i$(1 or −1) for $i$=1, . . . . , $m$, and the remaining signals are set to zero. The shift-register SR1 holds the vector $R$, as before. In the shift-register SR2, $x_i$ is replaced by the estimate of $y_i$, for $i = 1, \ldots, g = 1$, and the remaining signals are set to zero. The estimates of the $\{y_i\}$ are of course adjusted in steps during the iterative process. Each cycle of the iterative process now has $g$+ 1 steps, each of which involves a change in a different one of the estimates of the $\{y_i\}$. Thus the shift registers SR2 and SR3 are triggered simultaneously $g + 1$ times during each cycle and are then reset to the positions described above, ready for the next cycle. The precise mechanism whereby this arrangement yields the required estimate of $Y_1$ is a result of the particular symmetry which exists between the $\{y_i\}$ and the $\{z_i\}$ and may readily be shown theoretically.

If the arrangement shown in FIG. 8 is used both for determining $X$ and for updating the values of $Y_1$, each iterative detection process for $X$ is followed by an iterative process to estimate $Y_1$.

Of course, any of the iterative processes described above may be used to estimate $Y_1$. Further, the apparatus shown in FIG. 1 may be used. It should be noted, that, if separate apparatus is provided for the estimation of $Y_1$ either in accordance with FIG. 1 or using an iterative process, provision need be made for only $g + 1$ components instead of for $n$ components.

I claim:

1. For use in an electrical signalling system in which the signals are arranged to be split up into signal groups, each of which contains a predetermined number of signal elements which are linearly independent with respect to each other but not necessarily orthogonal when they are transmitted, corresponding signal elements in successive groups being related to each other and forming a series of signal elements; a receiver comprising: correlation detection means tuned to receive each of said linearly independent signal elements of a group; and means responsive to the output of said correlation detection means for producing a respective output signal for each of said signal elements and for eliminating cross correlation components from said output signals.

2. A receiver according to claim 1 in which said correlation detection means comprises a plurality of individual correlation detectors each tuned to receive a respective one of said linearly independent signal elements of a group.

3. A receiver according to claim 2 in which said means responsive to the output of said correlation detection means comprises a network of signal level changing links having one output for each of said linearly independent signal elements of a group, each correlation detector being individually connected to every said output by a respective set of said links, and each of said links having means for varying the degree of level changing thereof whereby cross-correlation components can be eliminated from the output signals.

4. A receiver according to claim 2 in which said means responsive to the output of said correlation detection means comprises respective means for generating a signal identical with the signal to which each of said individual correlation detectors in tuned, respective multiplier means for combining the output of each of said individual correlation detectors with the appropriate locally generated signal identical with the signal to which the correlation detector is tuned, and summation means responsive to said multiplier means to supply a feedback signal to inputs of said individual correlation detectors.

5. A receiver according to claim 4 further comprising a respective integrator connecting the output from each said correlation detector to its respective said multiplier means.

6. A receiver according to claim 4 further comprising a respective storage unit connecting the output from each said individual correlation detector to its respective multiplier means, each said storage unit being adapted on receipt of a control signal to provide an output signal which differs from its previous output signal by an amount dependent of the instantaneous input thereto from its associated individual correlation detector and to maintain said output signal until a further control signal is applied, and a control unit adapted to provide control signals to each said storage unit in a predetermined manner.

7. A receiver according to claim 2 further comprising means for determining the impulse response of the transmission path of said signalling system, said means comprising a shift register, a first switched inverter connected to the output of said shift register, a plurality of feedback paths equal in number to at least the minimum number of elements required to separate adjacent groups of elements to insure that they are orthogonal, each switching path including a respective further switched inverter, means for setting each switched inverter in accordance with a respective element of the most recently received signal group, and an output shift register having a number of stages equal to the number of switched inverters, said output shift register being connected to the output from the first switched inverter for receiving the elements of said impulse response.

8. A receiver according to claim 1 in which said correlation detector means comprises a single correlation detector, further comprising a first shift register, means for storing a group of said signal elements of the received signal in said first shift register, means for connecting said single correlation detector to each stage of said first shift register, a second shift register connected to form a ring and forming part of said single correlation detector, means for storing in said second shift register information indicative of the impulse response of the transmission path of said signalling system , and means for applying shift pulses to said second shift register to shift the stored information around the ring whereby said single correlation detector may be successively tuned to each signal element of the received signal.

9. A receiver according to claim 8 including a third shift register connected to form a ring, means for connecting said third shift register and said single correlation detector, said shift pulse applying means also being operatively connected to said third shift register, and means for storing in said third shift register estimates of the element values of the most recently received group of signal elements.

10. A receiver according to claim 8 further comprising an adder and a correction generator and in which said single correlation detector comprises a plurality of sections, each section having a subtraction circuit, a summation circuit and a pair of multipliers, the subtraction circuit having one input connected to a respective stage of said first shift register and its other input connected to the output of the associated summation circuit, one multiplier having an input connected to receive a correction signal and an output connected to the associated summation circuit, the other multiplier having one input connected to the associated subtraction circuit, both multipliers having their other inputs connected to a respective stage of said second shift register, the outputs of the second multipliers of all of said sections of said single correlation detector being connected to said adder the output of which, comprising said single correlation detector output signal, is connected to said correction generator for supplying said correction signal to the first multiplier of each said section.

11. A receiver according to claim 9 further comprising a fourth shift register, said first and fourth shift registers being so connected that, when one is receiving a signal group from the transmission path, the other is supplying the previous signal group to said single correlation detector.

12. A method of receiving signals in an electrical signalling system in which the signals are arranged to be split up into signal groups, each of which contains a predetermined number of signal elements which are linearly independent with respect to each other when transmitted but not necessarily orthogonal, the signal groups being arranged to be orthogonal with respect to each other at the receiver and corresponding signal elements in successive groups being related to each other and forming a series of signal elements; the method comprising the steps of: applying the signals to correlation detection means tuned to receive each of said linearly independent signal elements of a group and producing an output component for each of said signal elements; locally generating a signal identical with the signal to which the correlation detection means is tuned; combining each said output component with a respective, corresponding portion of said locally-generated signal to produce a feedback signal; and applying said feedback signal to the input of said correlation detection means.

13. A method according to claim 12 for use in a system in which the correlation detection means comprises a respective correlation detector for each of the signal elements of a group of the transmitted signal elements, having the further steps of: combining the output from each individual correlation detector with said respective, corresponding portion of said locally generated signal; and adding together the resulting signals to provide said feedback signal.

14. A method according to claim 13 comprising the further steps of: integrating the output from each individual correlation detector; multiplying each such integrated output with said respective, corresponding portion of said locally-generated signal; and adding together the signals produced from the multiplication operations to provide the feedback signal.

15. A method according to claim 13 comprising the further steps of: applying the outputs from said individual correlation detectors to respective signal controlled storage units, the change in the output of each storage unit being proportional to its input when a control signal is applied thereto and the output remaining constant when such control signal is removed; and using the outputs from the storage units to provide said feedback signal.

16. A method according to claim 15 in which control signals are applied to all of said storage units simultaneously and the control signals are repeated when said feedback signal has reached a steady value following application of the previous set.

17. A method according claim 15 in which control signals are applied to said storage units sequentially and in a fixed cycle.

18. A method according to claim 15 in which control signals are applied to said storage units cyclically but not necessarily in a fixed sequence and an operation is performed before the application of each control signal to identify the correlation detector and associated storage unit the sum of whose output signals has the largest magnitude of those not having had a control signal applied during the cycle, the next control signal being applied to such storage unit.

19. A method according to claim 15 in which control signals are applied to said storage units sequentially but not necessarily cyclically, each control signal being applied to the storage unit associated with the correlation detector having the output of largest magnitude immediately prior to the application of such control signal.

* * * * *